(12) United States Patent
Pinteau et al.

(10) Patent No.: US 9,303,616 B2
(45) Date of Patent: Apr. 5, 2016

(54) METHOD FOR ADAPTING AN ENGINE TO THE FUEL GRADE BY DECREMENTING THE INITIAL OCTANE NUMBER OF THE FUEL

(75) Inventors: Franck Pinteau, Chaville (FR);
Edouard Valenciennes, Paris (FR)

(73) Assignee: RENAULT S.A.S.,
Boulogne-Billancourt (FR)

( * ) Notice: Subject to any disclaimer, the term of this patent is extended or adjusted under 35 U.S.C. 154(b) by 1106 days.

(21) Appl. No.: 13/266,802

(22) PCT Filed: Mar. 8, 2010

(86) PCT No.: PCT/FR2010/050390
§ 371 (c)(1),
(2), (4) Date: May 23, 2012

(87) PCT Pub. No.: WO2010/125261
PCT Pub. Date: Nov. 4, 2010

(65) Prior Publication Data
US 2012/0232775 A1 Sep. 13, 2012

(30) Foreign Application Priority Data
Apr. 30, 2009 (FR) ..................................... 09 52887

(51) Int. Cl.
*G06F 7/00* (2006.01)
*G06F 17/00* (2006.01)
*F02P 5/152* (2006.01)

(52) U.S. Cl.
CPC ............. *F02P 5/1527* (2013.01); *F02P 5/1523* (2013.01); *Y02T 10/46* (2013.01)

(58) Field of Classification Search
USPC .......................... 123/406.29–406.35; 701/111
See application file for complete search history.

(56) References Cited

U.S. PATENT DOCUMENTS 4,586,475 A * 5/1986 Takahashi ............. F02P 5/1527
123/406.32
4,610,232 A * 9/1986 Iwata .................... F02P 5/1527
123/406.3
4,773,016 A * 9/1988 Abe et al. ...................... 701/109
(Continued)

FOREIGN PATENT DOCUMENTS

DE 40 01 474 8/1991
DE 40 01 476 8/1991

OTHER PUBLICATIONS

U.S. Appl. No. 13/266,837, filed Oct. 28, 2011, Pinteau, et al.
(Continued)

Primary Examiner — Stephen K Cronin
Assistant Examiner — David Hamaoui
(74) Attorney, Agent, or Firm — Oblon, McClelland, Maier & Neustadt, L.L.P.

(57) ABSTRACT

A method for adapting an engine to an octane number of fuel by decrementing an initial octane number. Starting with a reference setting of the spark advance in an engine operating range for a given octane number, the engine operating range being divided into a plurality of zones, each including an anti-pinking corrective value of the spark advance of the reference setting, the engine is switched to a reference setting that corresponds to a lower octane number: when a threshold value of the advance correction loop is exceeded in at least one zone, or when a counter of the number of zones, in which another threshold value of the advance correction loop is exceeded, exceeds a multi-zone threshold.

8 Claims, 2 Drawing Sheets

(56) References Cited

U.S. PATENT DOCUMENTS

| | | | |
|---|---|---|---|
| 4,934,327 A | | 6/1990 | Hidaka |
| 5,012,782 A | * | 5/1991 | Tokuda ................. 123/406.3 |
| 5,131,369 A | * | 7/1992 | Kanehiro et al. ........ 123/406.32 |
| 5,235,953 A | * | 8/1993 | Kato et al. ............... 123/406.3 |
| 5,243,951 A | * | 9/1993 | Nakaniwa ............... 123/674 |
| 5,845,620 A | * | 12/1998 | Miyashita et al. ......... 123/406.3 |
| 6,014,963 A | * | 1/2000 | Narita ..................... 123/674 |
| 6,513,509 B1 | * | 2/2003 | Matsumoto .............. 123/674 |
| 6,907,338 B2 | * | 6/2005 | Frankl et al. .............. 701/104 |
| 7,280,912 B2 | * | 10/2007 | Thompson et al. .......... 701/114 |
| 7,331,327 B2 | * | 2/2008 | Bhattarai ................. 123/406.3 |
| 9,032,932 B2 | * | 5/2015 | Pinteau et al. ........... 123/406.34 |
| 2009/0276147 A1 | * | 11/2009 | Hamama et al. ............ 701/111 |

OTHER PUBLICATIONS

International Search Report Issued Aug. 30, 2010 in PCT/FR10/050390 filed Mar. 8, 2010.

* cited by examiner

METHOD FOR ADAPTING AN ENGINE TO THE FUEL GRADE BY DECREMENTING THE INITIAL OCTANE NUMBER OF THE FUEL

BACKGROUND

The invention relates to a method of adapting the engine to the richness of the fuel, and especially to the octane number of this fuel. This invention notably relates to controlled-ignition engines the ignition advance of which can be controlled electronically. More particularly, the invention relates to a method of adaptation by decrementing the learned octane number of the fuel.

At the present time there are various types of fuel that have different characteristics. These characteristics include the octane number. Among the various fuels, the octane number may commonly adopt the approximate values of 98, 95, 91 and 87. Fuels with octane numbers of 98 and 95 are often used in Western Europe, those with an octane number of 91 may be encountered in the United States and those with an octane number of 87 are used, for example, in Iran.

In order to optimize the compromise between performance, fuel consumption and reliability, it is desirable to have an engine setting, and notably the ignition advance setting, that is adapted to suit each octane number.

When the ignition advance setting is defined for one octane number and the fuel used has a different octane number, notably when changing geographical zone, the engine may operate unsatisfactorily. It may, for example, begin to ping, particularly if the engine is optimized for a fuel that has a higher octane number than the fuel being used, or alternatively the capability of the engine may not be best optimized if the fuel being used has an octane number lower than that for which the engine is set up.

Pinging may notably be due to a phenomenon of abnormal combustion involving detonation that notably generates a significant heat transfer liable to damage the combustion chamber. Pinging may arise somewhat randomly under certain operating conditions, notably when the octane number of the fuel is not suited to the engine setting.

Techniques for correcting pinging include the anti-pinging correction explained hereinbelow. This is essentially used when the discrepancies are small. This correction, which is curative, is unable satisfactorily to correct the effects of pinging when the difference in octane number is too great.

This known anti-pinging correction involves two types of action:
 a rapid correction, also known as a fast loop (BR) correction, which greatly reduces the ignition advance, and
 a slow correction, also known as a slow loop (BL) correction, which reduces the ignition advance less significantly.

Thus, for example, when pinging is detected at a time t, the fast loop (BR) and the slow loop (BL) are activated in order to obtain a correction value of X° by which the ignition advance needs to be corrected in order to eliminate pinging.

At a time t+1, if pinging is no longer detected, the value of the slow loop (BL) is reduced by a given value. This value is reduced again each time t+1 at which pinging is not detected.

If the pinging phenomenon is detected again, the fast loop (BR) and the slow loop (BL) are activated again in order once again to correct the ignition advance.

A device capable of managing two settings based on two different octane numbers is also known. If pinging is detected over a certain period of time with a setting based on the octane number of 98, the setting is modified so that it becomes based on the setting for the octane number of 91. When the engine stops, the setting is "reset to zero", which means to say that the setting reverts to the default setting (based on an octane number of 98).

These correction devices are not, however, ideal. Specifically, either they lack performance and finesse regarding the octane number detected, or they are always on the edge of detecting pinging, and this may lead to continued damage to the combustion chamber.

BRIEF SUMMARY

It is an objective of the invention to allow the engine to be adapted to best suit the number of the fuel.

According to a first aspect, the invention relates to a method of adapting the engine to the octane number of the fuel (by decrementing the learned octane number), in which the engine has a reference setting of the ignition advance in an engine operating range for a determined octane number, said reference setting corresponding to a pinging-free operation of the engine (but on the edge of pinging) at a determined speed and a determined torque,
the engine operating range is broken down into several zones, each comprising an anti-pinging corrective value to be applied to the ignition advance of the reference setting, the method comprising at least the following steps:
 detecting the presence of pinging over a time period t;
 activating an ignition advance angle correction loop if pinging is detected over a time period t;
 incrementing a zones number counter (CTR) in each time period (X ms) by the number of zones in which the correction of the advance of the zone concerned is greater than a first predetermined threshold specific to this zone;
 testing the correction of the advance of each zone so as to determine whether said correction of the advance exceeds a second predetermined threshold specific to this zone;
in which, when the zones number counter reaches or exceeds a third predetermined threshold, or when the correction of advance of at least one zone exceeds said second threshold specific to this zone, a switch to a reference setting corresponding to a lower octane number is triggered.

The "engine operating range" means a range of values comprised between the abscissa axis representing the engine speed, generally in revolutions per minute (rpm), the ordinate axis representing engine load, generally in Newton meter (N.m), and a curve representing the maximum performance of the engine.

A "reference setting" means the given engine management values including a given ignition advance value for an engine operating range, the setting being given for a determined speed and a determined torque.

Each reference setting may be specific to a given engine operating range, and differ according to the octane number of the fuel. For example, the maximum torque deliverable by the engine is dependent on the octane number. It will thus be understood that the switch to a reference setting also corresponds to a switch to a different engine operating range.

Preferably, the correction loop comprises a fast correction loop and a slow correction loop, the incrementing of the zones number counter and the determination of the correction to ignition relying on the values from the slow loop (BL) in the various zones of the engine operating range.

Advantageously, each zone retains in memory the last correction of the ignition advance angle, especially the last correction of the ignition advance slow loop (BL).

The placing in memory of the last slow-loop correction (BL) of the ignition angle in a zone makes it possible in particular, when returning to the zone, to avoid restarting from a base ignition advance value but to benefit from the performance determined previously and to restart from the last correction value obtained.

In particular, switching from a reference setting to a lower reference setting reinitializes the memories of each zone of the ignition angle correction value.

In particular, the method comprises at least three reference settings.

Advantageously, the reference settings are based on at least three adjustable octane numbers. The following octane numbers can be chosen: 98, 95, 91 and 87.

However, these octane numbers may be chosen freely so as to allow adaptation to the requirements and constraints of the engine.

According to one particular embodiment, at least one ethanol setting, with ethanol numbers E85 and/or E100, may be added.

According to one particular embodiment, each reference setting comprises at least four zones and advantageously at least sixteen zones.

Advantageously, the engine operating range for each reference setting comprises at least 18 zones.

A first zone, hereafter known as zone 0, requiring no corrective value to be applied to the ignition advance, the risks of pinging being deemed to be sufficiently low.

An extreme zone, hereafter known as zone 17, in which it is difficult to detect engine pinging, and for which the pinging correction value from the previous zone will be applied.

The next zones are called zone 1 to zone 16 and each comprise an initial anti-pinging corrective value, as well as two thresholds associated with a monozone or multizone switch.

BRIEF DESCRIPTION OF THE DRAWINGS

The invention is now described with reference to the non-limiting drawings, in which.

DETAILED DESCRIPTION

Figure 1:
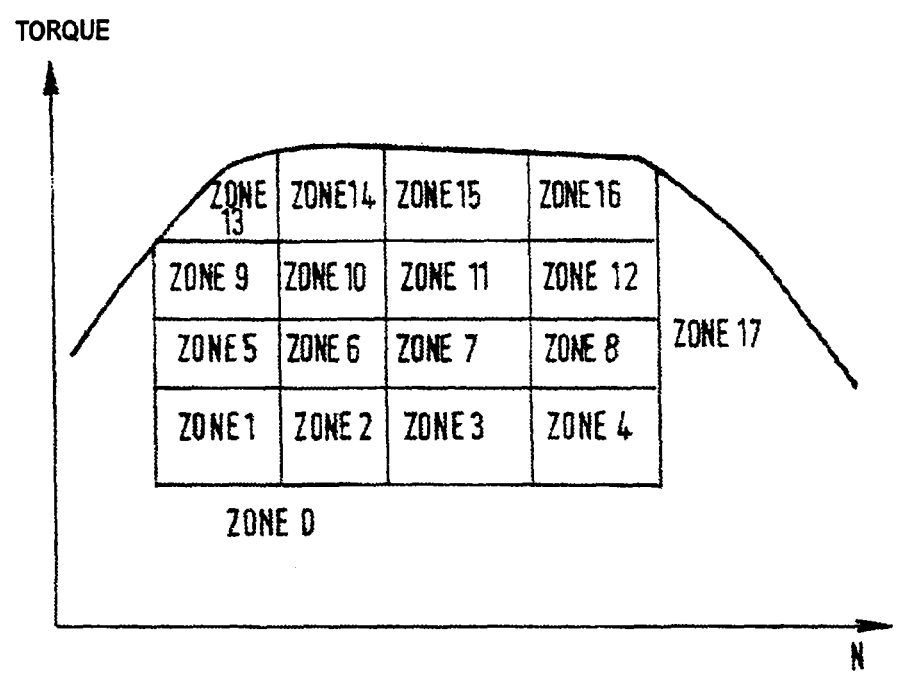
FIG. 1 depicts the engine operating range of a vehicle.

FIG. 1 depicts the engine operating range of a vehicle, in which the abscissa axis represents the number of revolutions/minute and the ordinate axis represents the engine load, also known as torque, in N.m. The curve represents the maximum performance of the engine.

In this figure there is a grid made up of 18 zones numbered from 0 to 17.

Zone 0, determined as being below a particular torque, does not require any particular advance setting because the phenomenon of pinging is rare and therefore carries little risk of damaging the combustion chamber.

In zone 17, which is determined as being above a given speed, it becomes difficult to detect pinging. The corrective value from the previous zone crossed is therefore applied here.

Zones 1 to 16 each comprise a slow loop (BL) anti-pinging corrective value to be applied to the ignition advance.

For example, zone 1 may have a corrective value (BL_1) of 2°, zone 2 a corrective value (BL_2) of 5°, zone 3 a corrective value (BL_3) of 4°, zone 4 a corrective value (BL_4) of 1°, and so on.

During engine operation, passage through zone 1 will therefore allocate an ignition advance of 29°, corresponding to the reference setting of 31°, minus a corrective value of 2° corresponding to the corrective value for zone 1. If the engine enters zone 2, the ignition advance will be 35°, corresponding to the 40° of the reference setting, minus 5° corresponding to the corrective value for zone 2. These various corrective values need to correct the ignition advance in order to obtain pinging-free operation.

However, the pinging phenomenon is not always eradicated, particularly if the fuel chosen has a lower octane number.

For each pinging phenomenon, and irrespective of the zone concerned, an ignition advance correction loop, usually comprising a fast loop (BR) and a slow loop (BL) is activated. Thus, for each pinging phenomenon, the slow loop (BL) is incremented by a predetermined value. As an example, it will be considered that the fast loop (BR) applies a correction of 4° and the slow loop (BL) a correction of 2°, to each pinging phenomenon. If the pinging phenomenon is no longer detected, the slow loop (BL) is degressive over time by a predetermined value. As an example, it will be considered that for each time t+1, the value will decrease by one quarter of its initial value, namely by 0.5°.

This then yields the following operation: when entering zone 1, the overall value determined above, namely 31°-2° is applied. If pinging is detected, the fast loop (BR) value of 4° and the slow loop (BL) value of 2° are added. This then gives an ignition advance setting of 31°-4°-2°, namely of 25°. At a time t+1, if the pinging phenomenon is no longer present, the slow loop value is decremented, in this example by 0.5°. In the same instant, the fast loop (BR) is disabled. Thus, at a time t+1, a corrective value will be 29.5° (31°-1.5°), and at a time t+2 a corrective value will be 30°, and so on. When a pinging phenomenon is detected again, the correction loop is activated once again. One might therefore reach a time t+3 where pinging is detected, the previous corrective value being 30°, and the value of BR+BL, namely 4°+2° are taken away from that. That then yields an ignition advance setting of 24°.

Figure 2:
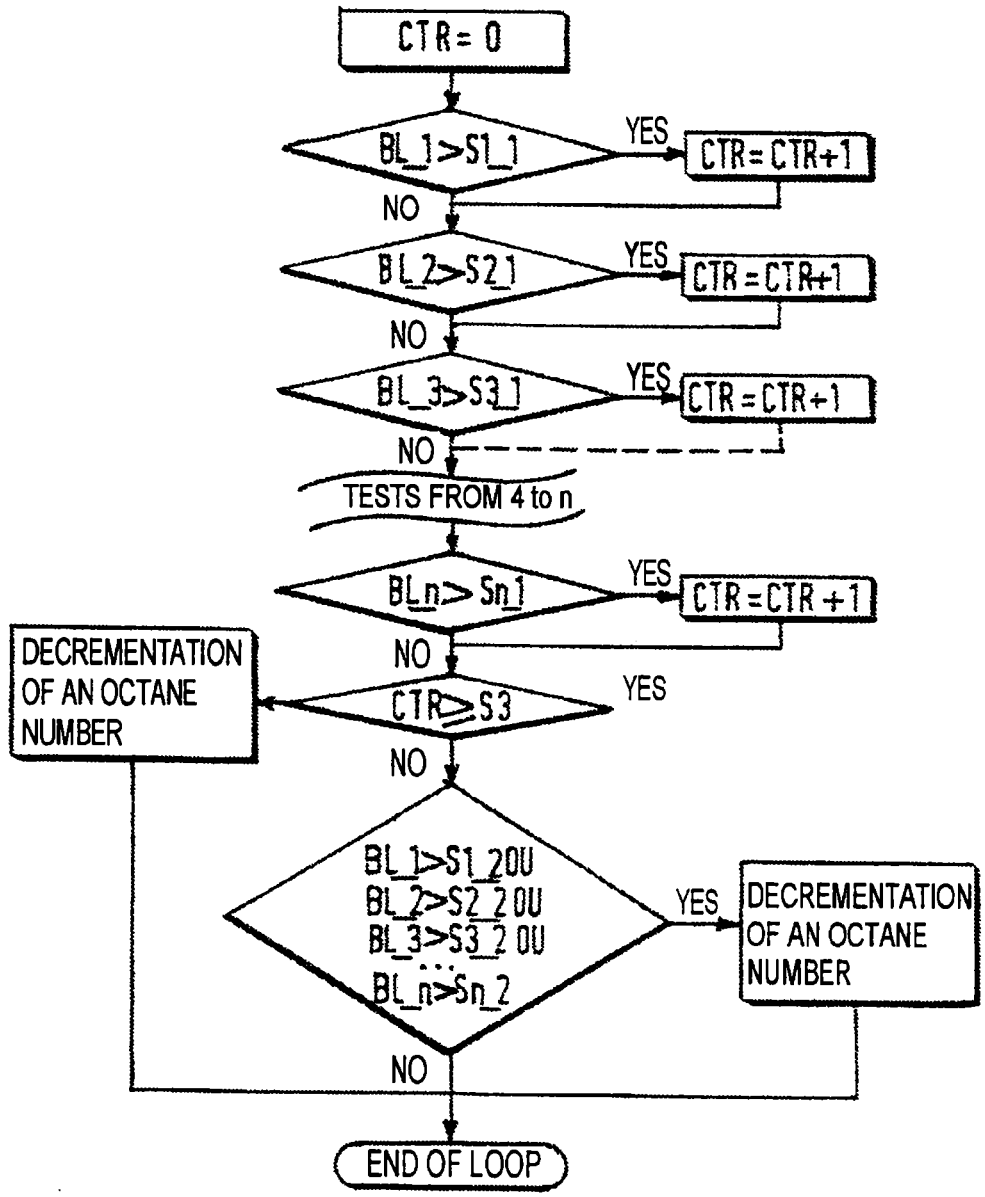
FIG. 2 is a diagram of the adaptation method according to the invention.

The invention relies on two modes of switching to a reference setting corresponding to a lower octane number, these being illustrated by the diagram of FIG. 2.

The first mode of switching relies on the fact that each zone from 1 to 16 comprises a threshold value (S1_2 to S16_2) of the advance correction loop. If the threshold value is exceeded in at least one zone, it is concluded that the setting of the advance is not adapted for this type of fuel and the setting is adjusted to a reference setting adapted for a lower octane number.

In our example, let us take as switching threshold value a value of slow correction loop (BL) of 4° of advance, irrespective of the zone concerned. A threshold of 4° of advance (S1__2_4) is then fixed for zone 1, 4° of advance (S2__2_4) for zone 2 and so on and so forth. It would be possible to envisage having different thresholds in different zones.

If we are located in zone 1, the slow loop correction (BL_1) is incremented or decremented as a function of the pinging detected. When one is in this zone and pinging is detected, the correction of the slow loop is fully incremented (by 2° in the example). The slow loop corrections for the neighboring zones are partially incremented. When one is in zone 1 and there is no pinging detected, with a lower amplitude than in the case of pinging detected (0.5 in the example), the slow loop correction (BL_1) of zone 1 is fully decremented and the slow loop corrections for the neighbouring zones are partially decremented.

The values of slow loop corrections may be placed in memory or reset to zero regularly, for example when adding fuel or at any other predetermined moment.

Having regard to the mechanisms for incrementing and decrementing the slow loop correction, as soon as the latter reaches at least 4° in zone 1, there is a switch to a reference setting adapted to a fuel having an octane number of 91 (considering that the reference setting was initially based on an octane number of 98).

It is possible to envisage having several reference settings corresponding to diverse octane numbers. Each reference setting of the ignition advance defining the ignition advance settings as well as the value of thresholds for correction of slow loop for change of reference octane number.

The second mode of switching to a reference setting relating to a fuel with lower octane number than the recurrent reference setting relies on the fact that, for each zone, another threshold (S1_1 to S16_1) is defined for the slow loop correction (BL) beyond which this zone is counted by means of a zone number counter (CTR). A number of zones for which the threshold Sn_1 associated with each of the zones n is exceeded is then obtained. When this number of zones reaches or exceeds a multizone threshold (S3), the setting is then switched to a reference setting relating to a fuel of lower octane number than the current reference setting.

Thus, for example, if the threshold S3 is defined at 3, it suffices for the slow loop of zone 1 to exceed S1_1, the slow loop of zone 2 to exceed S2_1, and the slow loop of zone 4 to exceed S4_1 in order for the octane number setting to be switched to 91 (Considering that the reference setting was initially based on an octane number of 95).

This counting of zones by the counter CTR is performed every X ms (X being equal for example to 100), this counter being reset to zero every X ms before starting the count.

Two possible modes of switching to the lower octane number setting are thus obtained, the first relying on the exceeding of a slow loop advance correction threshold in at least one zone and the second being triggered when reaching or exceeding a number of zones in which the slow loop correction exceeds another threshold.

Each zone retains the last value of slow loop correction of the advance setting so as to begin again from the optimum setting value on the next entry to the said zone. These values may however be reset to zero upon a change of reference setting and hence of engine operating range.

The invention claimed is:

1. A method of adapting an engine to an octane number of fuel by decrementing a learned octane number, the method starting out from a reference setting of an ignition advance in an engine operating range for a determined octane number, the reference setting corresponding to a pinging-free operation of the engine at a determined speed and a determined torque, the operating range of the engine being broken down into plural zones, each of the zones including an anti-pinging corrective value to be applied to the ignition advance of the reference setting, the method comprising:

detecting the presence of pinging over a time period t during which the engine is operating at the reference setting;

activating an ignition advance angle correction loop if pinging is detected over the time period t;

incrementing a zone number counter in the time period t by a number of zones in which the correction of the advance of the zone concerned is greater than a first predetermined threshold specific to this zone;

testing the correction of the advance of each zone so as to determine whether the correction of the advance exceeds a second predetermined threshold specific to this zone;

switching the reference setting of the engine to an updated reference setting corresponding to a lower octane number, when the zone number counter reaches or exceeds a third predetermined threshold;

switching the reference setting of the engine to the updated reference setting corresponding to the lower octane number when the correction of advance of at least one zone exceeds the second threshold specific to this zone; and operating the engine at the updated reference setting.

2. The method as claimed in claim 1, wherein the correction loop comprises a fast correction loop and a slow correction loop, the incrementing of the zone number counter and the determination of the correction to ignition relying on the values from the slow loop in the various zones of the engine operating range.

3. The method as claimed in claim 1, wherein each zone retains in memory a last correction of the ignition advance angle.

4. The method as claimed in claim 3, wherein the switching from the reference setting to the updated reference setting reinitializes memories of each zone of the ignition angle correction value.

5. The method as claimed in claim 1, comprising at least three reference settings.

6. The method as claimed in claim 1, wherein each reference setting comprises at least four zones.

7. The method as claimed in claim 1, wherein each reference setting comprises at least sixteen zones.

8. The method as claimed in claim 1, wherein the zone number counter is reset to zero after the time period t.

* * * * *